US010036349B2

(12) United States Patent
Kernemp et al.

(10) Patent No.: US 10,036,349 B2
(45) Date of Patent: Jul. 31, 2018

(54) AFTERBODY FOR A TURBOJET ENGINE COMPRISING A NOZZLE PROVIDED WITH A THRUST REVERSER SYSTEM THAT INCORPORATES A CROWN OF NOISE-REDUCING CHEVRONS

(71) Applicants: SNECMA, Paris (FR); AIRCELLE, Gonfreville-l'Orcher (FR)

(72) Inventors: Irwin Kernemp, Moissy-Cramayel (FR); Jonathan Langridge, Moissy-Cramayel (FR); Sébastien Pascal, Moissy-Cramayel (FR); Denis Guillois, Limours (FR); Gérard Clere, Clamart (FR); Loïc Chapelain, Thiais (FR)

(73) Assignees: SNECMA, Paris (FR); AIRCELLE, Gonfreville-l'Orcher (FR)

( * ) Notice: Subject to any disclaimer, the term of this patent is extended or adjusted under 35 U.S.C. 154(b) by 70 days.

(21) Appl. No.: 14/916,467

(22) PCT Filed: Sep. 5, 2014

(86) PCT No.: PCT/FR2014/052194
§ 371 (c)(1),
(2) Date: Mar. 3, 2016

(87) PCT Pub. No.: WO2015/036679
PCT Pub. Date: Mar. 19, 2015

(65) Prior Publication Data
US 2016/0215728 A1    Jul. 28, 2016

(30) Foreign Application Priority Data

Sep. 10, 2013 (FR) ...................... 13 02113

(51) Int. Cl.
*F02K 1/48* (2006.01)
*F02K 1/82* (2006.01)
(Continued)

(52) U.S. Cl.
CPC .................. *F02K 1/48* (2013.01); *F02K 1/60* (2013.01); *F02K 1/62* (2013.01); *F02K 1/763* (2013.01);
(Continued)

(58) Field of Classification Search
CPC ..... F02K 1/11; F02K 1/44; F02K 1/48; F02K 1/386; F02K 1/60; F02K 1/46;
(Continued)

(56) References Cited

U.S. PATENT DOCUMENTS 3,344,882 A * 10/1967 Bellion ................... F02K 1/383
181/221
3,568,792 A    3/1971 Urquhart
(Continued)

FOREIGN PATENT DOCUMENTS

EP    1 026 387 A2    8/2000
GB    1 435 946 A    5/1976

OTHER PUBLICATIONS

International Search Report dated Jan. 16, 2015, issued in corresponding International Application No. PCT/FR2014/052194, filed Sep. 5, 2014, 2 pages.
(Continued)

*Primary Examiner* — Gerald L Sung
*Assistant Examiner* — Alain Chau
(74) *Attorney, Agent, or Firm* — Christensen O'Connor Johnson Kindness PLLC (57) ABSTRACT

An afterbody for a turbojet engine having a central axis, provided with a nozzle comprising two doors facing each other between two lateral beams. The doors pivot around
(Continued)

axes defining a pivot direction, between a retracted position, in which a middle portion of the downstream edge of the doors forms the edge of the outlet section of the nozzle combined with the downstream edges of the two lateral beams, and a deployed position, in which the middle portions of the downstream edges of the pivoting doors come together so as to block the channel between the two lateral beams in order to reverse the thrust of the turbojet engine gases. The edge of the outlet section of the nozzle further having a crown of noise-reducing chevrons alternating with indentations and the afterbody.

18 Claims, 7 Drawing Sheets (51) Int. Cl.
*F02K 1/60* (2006.01)
*F02K 1/62* (2006.01)
*F02K 1/76* (2006.01)

(52) U.S. Cl.
CPC ........ *F02K 1/827* (2013.01); *F05D 2250/182* (2013.01)

(58) Field of Classification Search
CPC ... F02K 1/605; F02K 1/68; F02K 1/72; F02K 1/827; F02K 1/763; F05D 2250/182; F05D 2250/183; F05D 2250/184
See application file for complete search history.

(56) References Cited

U.S. PATENT DOCUMENTS

| | | | |
|---|---|---|---|
| 4,147,027 A | 4/1979 | Greathouse | |
| 6,233,920 B1* | 5/2001 | Presz, Jr. | F02K 1/48 60/230 |
| 6,256,979 B1* | 7/2001 | Fournier | F02K 1/60 239/265.37 |
| 2005/0172611 A1* | 8/2005 | James Blodgett | B64D 33/06 60/262 |
| 2005/0193716 A1* | 9/2005 | Schlinker | F02K 1/386 60/226.1 |

OTHER PUBLICATIONS

Written Opinion of the International Searching Authority, issued in corresponding International Application No. PCT/FR2014/052194, filed Sep. 5, 2014, 5 pages.

Written Opinion of the International Searching Authority dated Jan. 16, 2015, issued in corresponding International Application No. PCT/FR2014/052194, filed Sep. 5, 2014, 5 pages.

International Preliminary Report on Patentability dated Mar. 15, 2016, issued in corresponding International Application No. PCT/FR2014/052194, filed Sep. 5, 2014, 1 page.

* cited by examiner

AFTERBODY FOR A TURBOJET ENGINE COMPRISING A NOZZLE PROVIDED WITH A THRUST REVERSER SYSTEM THAT INCORPORATES A CROWN OF NOISE-REDUCING CHEVRONS

FIELD OF THE INVENTION

The present invention relates to the field of afterbodies of turbojet engines which are equipped with thrust reversers. It relates more particularly to the integration of noise-reduction chevrons when the doors of the thrust reverser contribute to the geometry of the output portion of the exhaust nozzle on the afterbody.

PRIOR ART

More specifically, the invention relates to an afterbody, of the type known as PERT (planar exit rear target), which incorporates two doors each having an upstream edge and a downstream edge, with reference to the direction of flow of the gases. Said doors extend downstream as far as the exhaust nozzle output and are each pivotally mounted about articulation shafts between a retracted position, allowing the free passage of the jet into the exhaust nozzle, and a deployed position, in which the jet is deflected against said doors to create a reverse thrust. In the retracted position, the doors contribute to defining, in combination with two lateral doors, the exhaust nozzle of the afterbody.

Embodiments of PERT-type reversers for exhaust nozzles having a circular output portion are already known, in particular from the patent FR2764000. This type of system ensures the braking role thereof, in particular because the kinematics for closing doors having a downstream edge consisting of a small portion of the circular output portion of the exhaust nozzle makes it possible to satisfactorily block the channel between the lateral beams when said doors are deployed. It is particularly suitable for turbojet engines of business aircraft, which are usually mixed-flow turbojet engines.

However, the design of a turbojet engine is also subject to constraints in terms of acoustic performance for different speeds according to the flight conditions (cruising, take-off, landing, etc.). The difference in speeds between the jet at the exhaust nozzle output and the external air leads to fluid shearing and thus turbulence, and this causes noise, commonly referred to as "jet noise". Said "jet noise" is a broadband noise which is particularly disruptive during take-off phases of the aircraft.

The use of chevrons which are placed in a ring on the downstream end of the exhaust nozzle is a known means for reducing this noise in the most disruptive flight phases. For example, patent application EP1873389 describes chevrons whilst pointing out the benefit of moving them into the jet to reduce the noise and highlighting the shape of the pattern of the cutout in the trailing edge. More particularly, the application FR2986832 has, in the case of an exhaust nozzle having a shape which corresponds to a mixed-flow turbojet engine afterbody, a chevron design inside which the duct forms a convergent-divergent.

It is thus important to be able to integrate a ring of noise-reduction chevrons in an equipped turbojet engine afterbody of the PERT type. However, as has already been mentioned, effective noise-reduction chevrons severely deform the roundness of the edge of the output portion of the exhaust nozzle. In particular, they form teeth on the downstream edges of the doors which meet when said doors are deployed, and are thus able to limit the closure of the channel between the lateral beams and severely impair the efficiency of the reverser.

The present invention is intended to propose a solution which makes it possible to use a ring of noise-reduction chevrons with a PERT-type thrust reverser whilst simultaneously preserving the thrust-reversal performance and the noise reduction obtained using a ring of chevrons which is adapted to the exhaust nozzle of the afterbody.

SUMMARY OF THE INVENTION

In order to achieve said objectives, the invention relates to a afterbody of a turbojet engine which has a central axis and is equipped with an exhaust nozzle comprising two doors which are mounted opposite one another between two lateral beams and pivot about shafts defining a pivot direction, between a retracted position, in which a middle portion of the downstream edge of said doors forms the edge of the output portion of the exhaust nozzle in combination with the downstream edges of the two lateral beams, and a deployed position, in which said middle portions of the downstream edges of the pivoting doors join together to block the channel between the two lateral beams in order to reverse the thrust of the gases from the turbojet engine, the edge of the output portion of the exhaust nozzle further comprising a ring of noise-reduction chevrons alternating with indentations, said ring being arranged in such a way that each noise-reduction chevron formed on the middle portion of the downstream edge of a pivoting door is opposite an indentation in the middle portion of the other pivoting door in the direction which is perpendicular to said pivoting direction. Said afterbody is notable in that it is arranged in such a way that, when the doors are in the deployed position, the chevrons of a door interlock with the indentations of the opposite door without any overlapping of the middle downstream edges of the doors.

Since the middle portions of the downstream edges of the pivoting doors form the edge of the output portion of the exhaust nozzle only from the ends of the downstream edges of the lateral beams, they occupy only an arc of a circle which corresponds to a limited angular sector. Thus, in the deployed position, said middle portions of the downstream edges of the doors are not overly inclined with respect to one another, at the ends thereof, when they meet around the same plane, in the middle of the channel between the lateral beams. The chevrons therefore do not have an overly high angle of attack, and the fact that they have been offset prevents them from overlapping. These combined elements make it possible to move the pivoting doors sufficiently closer together in the deployed position such that, firstly, there are no contacts which can destroy the chevrons and that, secondly, the leak cross section between the edges of the two doors is sufficiently small to allow the reverser to create an effective counter-thrust.

According to different variants of the invention which can be taken together or separately to accommodate the geometry of the chevrons and facilitate bringing the doors closer together over the middle portion thereof:
- the cutting out of the ring of chevrons between the downstream edges of the lateral beams and the middle portion of the downstream edge of the pivoting doors is carried out close to the apex of an indentation;
- the number of chevrons in the ring is odd;
- the chevrons placed on the doors are symmetrical with respect to the axial plane which is perpendicular to said pivoting direction;

the geometry of the chevrons changes over the middle portion of the downstream edge of the pivoting doors according to the position thereof azimuthally around the central axis with respect to the axial plane which is perpendicular to said pivoting direction, so as to facilitate bringing the downstream edges of the doors closer together in the deployed position;

the penetration of the chevrons which are placed on the middle portion of the downstream edge of the pivoting doors decreases as the distance thereof from the axial plane which is perpendicular to said pivoting direction increases;

the indentations and the noise-reduction chevrons have a substantially triangular shape having rounded apexes on the downstream edges of the doors;

the geometry of the chevrons which are placed on the downstream edges of the two lateral beams differs from that of the chevrons placed on the middle portion of the downstream edge of the pivoting doors such that the acoustic performance of the chevrons placed on the lateral beams is higher than that of the chevrons placed on the pivoting doors;

the distance separating the two points connecting the downstream edge of each lateral beam to the middle portion of the downstream edge of the pivoting doors is at least equal to two thirds of the maximum gap between the middle portions of the downstream edge of the two pivoting doors in the plane which is transverse to the axis which passes through said connection points.

The invention also relates to a mixed-flow turbojet engine comprising an afterbody having the features above, and in particular a mixed-flow turbojet engine further comprising a lobed mixer inside the exhaust nozzle, wherein the hot lobes are equal in number to the noise-reduction chevrons and are centred in azimuth on said chevrons.

BRIEF DESCRIPTION OF THE DRAWINGS

The present invention will be better understood, and other details, features and advantages of the invention will become clearer upon reading the following description with reference to the accompanying drawings, in which.

DETAILED DESCRIPTION OF THE INVENTION

Figure 1:
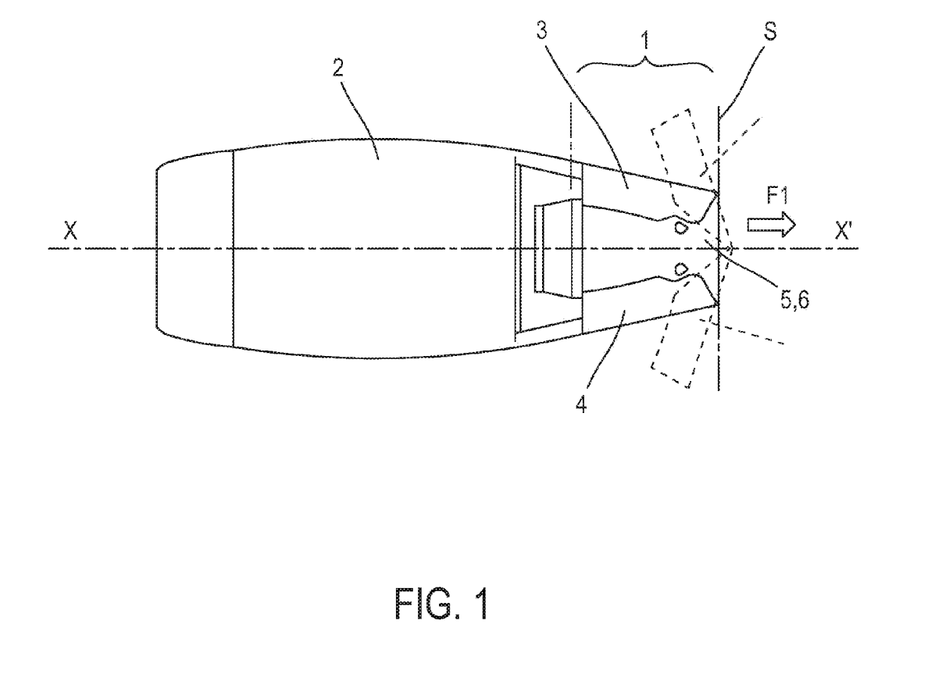
FIG. 1 is a schematic view of a turbojet engine indicating the position of the thrust reverser.

With reference to FIG. 1, the invention relates to the adaptation of noise-reduction chevrons on an exhaust nozzle 1 which is arranged at the output of the engine 2, having a central axis XX', and equipped with a thrust-reversal system which is capable of diverting the gas flow F1 from the engine. The thrust-reversal system in question comprises two tilting doors, 3 and 4, which are involved in forming the geometry of the exhaust nozzle 1 up to the edge of the output portion S thereof in the retracted position, shown as a continuous line, and which block the channel between two lateral beams 5 and 6, in the open position, shown as a broken line.

Figure 2:
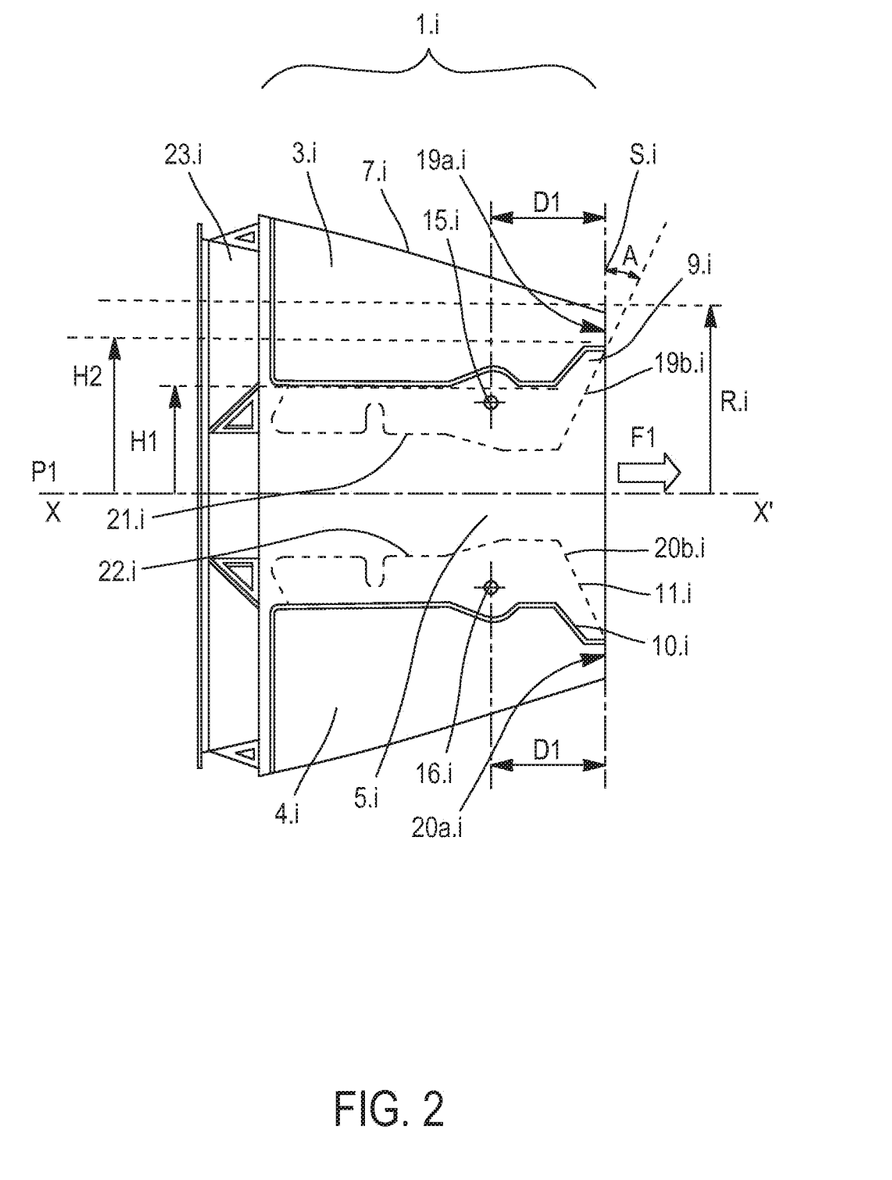
FIG. 2 is a schematic side view of an afterbody comprising an exhaust nozzle having a circular output portion with the thrust reverser in the closed position.
Figure 3:
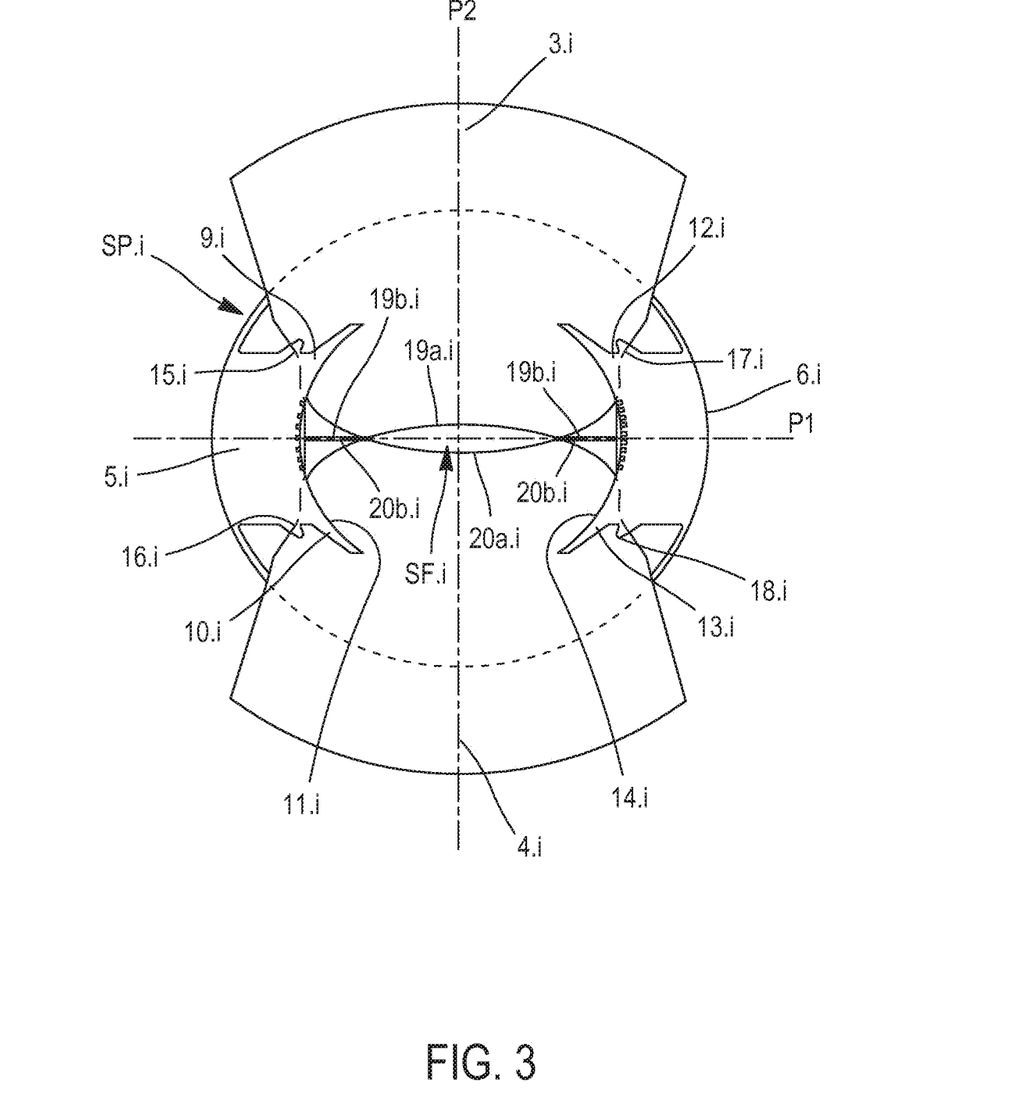
FIG. 3 is a schematic view of an afterbody comprising an exhaust nozzle having a circular output portion with the thrust reverser in the open position.

FIGS. 2 and 3, which are taken from FR 2764000, show the operating principle of the PERT thrust-reversal system on an exhaust nozzle having the reference numeral $1.i$ without noise-reduction chevrons, having a circular output portion $S.i$. FIG. 2 shows the arrangement of the thrust-reversal system in the open position. The exhaust nozzle $1.i$ comprises an outer wall $7.i$ which is in contact with the external air flow and an inner wall $8.i$ which is not shown in the drawing, and which forms the duct through which the flow F1 of the gases is ejected from the engine. Said exhaust nozzle is substantially axisymmetric about the axis XX' of the turbojet engine, and the outer and inner portions of the exhaust nozzle $1.i$ in the planes which are transverse to the axis XX' are circular.

The thrust-reversal system occupies the downstream portion of the exhaust nozzle $1.i$ up to the edge of the output portion $S.i$ thereof. In the example shown, the lateral beam $5.i$, which is symmetrical with respect to the horizontal plane P1 passing through the axis XX', forms the walls of the exhaust nozzle over a height H1 on either side of the horizontal axial plane P1, which is substantially constant over the longitudinal extension thereof. However, downstream, said beam has two protrusions, $9.i$ and $10.i$, which move away from the horizontal plane P1 in such a way that the downstream edge $11.i$ of the lateral beam $5.i$ forms the downstream edge of the exhaust nozzle $1.i$ over the output portion $S.i$ thereof, up to a height H2 which is greater than H1. In the example shown, said height H2 represents approximately 80% of the value of the radius $R.i$ of the edge of the output portion $S.i$ of the exhaust nozzle, which is generally at least equal to two thirds of said radius. The second lateral beam $6.i$, which is not shown in FIG. 2 but can be seen in FIG. 3, can be symmetrical to the beam $5.i$ with respect to the vertical axial plane P2 with protrusions $12.i$ and $13.i$ and a downstream edge $14.i$.

With reference to FIGS. 2 and 3, the lateral beams $5.i$ and $6.i$ also support shafts $15.i$, $16.i$ and those symmetrical thereto, $17.i$, $18.i$, which can be seen in FIG. 3 and are perpendicular to the vertical axial plane P2, about which the doors $3.i$ and $4.i$ pivot. In FIG. 2, it can be seen that the shafts $15.i$ and $16.i$ of the lateral beam $5.i$ are located at a distance D1 upstream of the edge of the output portion $S.i$ and at a distance from the horizontal axial plane P1 which is substantially equal to the height H1 of the beam $5.i$ upstream of the protrusions $9.i$ and $10.i$.

When the doors 3.i and 4.i are retracted, in the closed position for the thrust reverser, the outer wall thereof joins that of the outer walls of the lateral beams, as shown for the beam 5.i in FIG. 2, so as to complete the shape of the outer wall of the exhaust nozzle 1.i. In particular, a middle portion 19a.i, 20a.i of the downstream edge of the doors 3.i, 4.i completes the downstream edges 11.i-14.i of the lateral beams 5.i, 6.i to form the circular edge of the output portion S.i of the exhaust nozzle 1.i.

The inner wall of the door 3.i and 4.i respectively covers the inner wall of the lateral beam 5.i along a line 21.i and 22.i respectively, which is located beyond the join at the outer walls, the outline of which on the vertical axial plane P2 is shown as a broken line in FIG. 2. This covering is carried out symmetrically on the lateral door 6i which is not shown in the drawing. The shape of the inner wall of the exhaust nozzle is thus determined up to the edge of the output portion S.i by the inner walls of the doors 3.i, 4.i and lateral beams 5.i, 6.i which meet on said lines 21.i, 22.i.

Furthermore, the curve 21.i, for example, comprises a portion 19b.i which meets the middle portion 19a.i and which forms the lateral portion of the downstream edge of the door 3.i. The outline of said portion 19b.i on the vertical plane P2 forms an angle A to the plane of the output portion S.i. Said lateral portion 19b.i continues in a symmetrical manner with respect to the vertical plane P2 on the other side of the middle portion 19a.i on the door 3.i. Likewise, the lateral portion 20b.i is constructed on the door 4.i by symmetry relative to the horizontal axial plane P1. The value of the angle A formed by the outline of a lateral portion, 19b.i or 20b.i, depends on the geometry of the exhaust nozzle and on the position of the pivot shafts 15.i, 16.i, 17.i, 18.i. In the example shown, said angle is equal to approximately 30°, and in any case is less than 40°. The position of the pivot shafts, 15.i, 16.i, 17.i, 18.i, and the value of the angle A are arranged in particular so that the thrust-reversal system verifies the property described hereinafter.

When the reverser is in the open position, with reference to FIG. 3, the doors 3.i, 4.i pivot about the shafts 15.i-17.i and 16.i-18.i in such a way that the lateral downstream edges 19b.i, 20b.i thereof are positioned on the horizontal axial plane P1. The middle downstream edges 19a.i, 20a.i of the two pivoting doors 3.i, 4.i then meet at the ends thereof. In the deployed position, the pivoting doors 3.i and 4.i thus block the downstream output of the channel formed by the two lateral beams 5.i and 6.i. The downstream lateral edges 19b.i and 20b.i are connected. By contrast, the middle downstream edges 19a.i and 20a.i, which are in the shape of an arc of a circle, leave a residual opening SF.i, the outline of which on a transverse plane has a lenticular shape. Fortunately, given the height H2 relative to the transverse axial plane at which the middle edges 19a.i and 20a.i start, said lenticular shape is very flattened, and the surface area of the projection thereof in a transverse plane represents a small portion of the surface area of the output portion S.i of the exhaust nozzle 1.i during free jet operation. In any case, said surface area represents less than 10% of the surface area of the output portion S.i.

Furthermore, when they are deployed, the doors 3.i and 4.i clear, upstream of the pivot shafts, 15.i, 16.i, 17.i, 18.i, a large opening SF.i for ejecting upstream between the lateral doors 5.i and 6.i, the surface of which is referred to as a well portion. The portion of the flow F1 reflecting on the doors 3.i and 4.i is thus the majority. The portion of the flow escaping through the leak portion SF.i represents less than 10% of the flow F1, and this makes it possible to achieve good counter-thrust performance using this thrust-reversal system.

Furthermore, the lateral beams 5.i, 6.i are fixed to the body of the engine in the continuation of the cowl thereof by a fixed structure 23.i, which is indicated in FIG. 2, and the thrust-reversal system comprises actuators for pivoting the doors 3.i, 4.i, which are not shown in the drawings.

An afterbody according to the invention is produced for example by modifying the exhaust nozzle having the reference numeral 1.i close to the output portion edge thereof. Said body is described hereinafter, using the same numbering of the elements thereof, except for the afterbody which has a reference numeral without the index.i.

Figure 4:
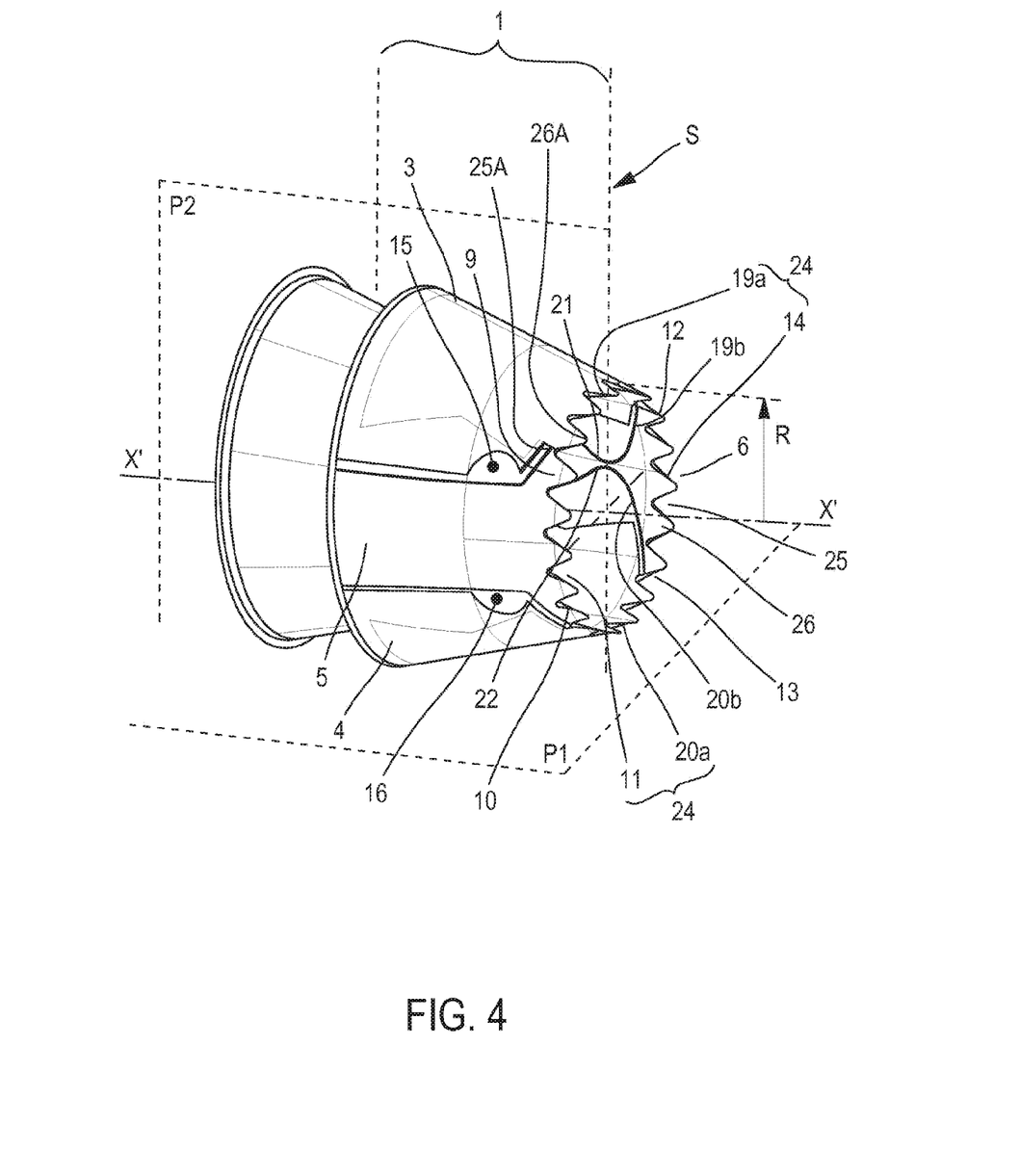
FIG. 4 is a schematic perspective side view of an afterbody according to the invention comprising an exhaust nozzle having noise-reduction chevrons at the output with the thrust reverser in the closed position.

An afterbody of this type, which is shown in FIG. 4 with the thrust-reversal system closed, thus comprises lateral beams 5 and 6 which are produced so as to have, in the same manner, a longitudinal portion having an average height H1 relative to the horizontal axial plane and protrusions 9, 10, 12, 13 moving away downstream from the horizontal axial plane.

Figure 6:
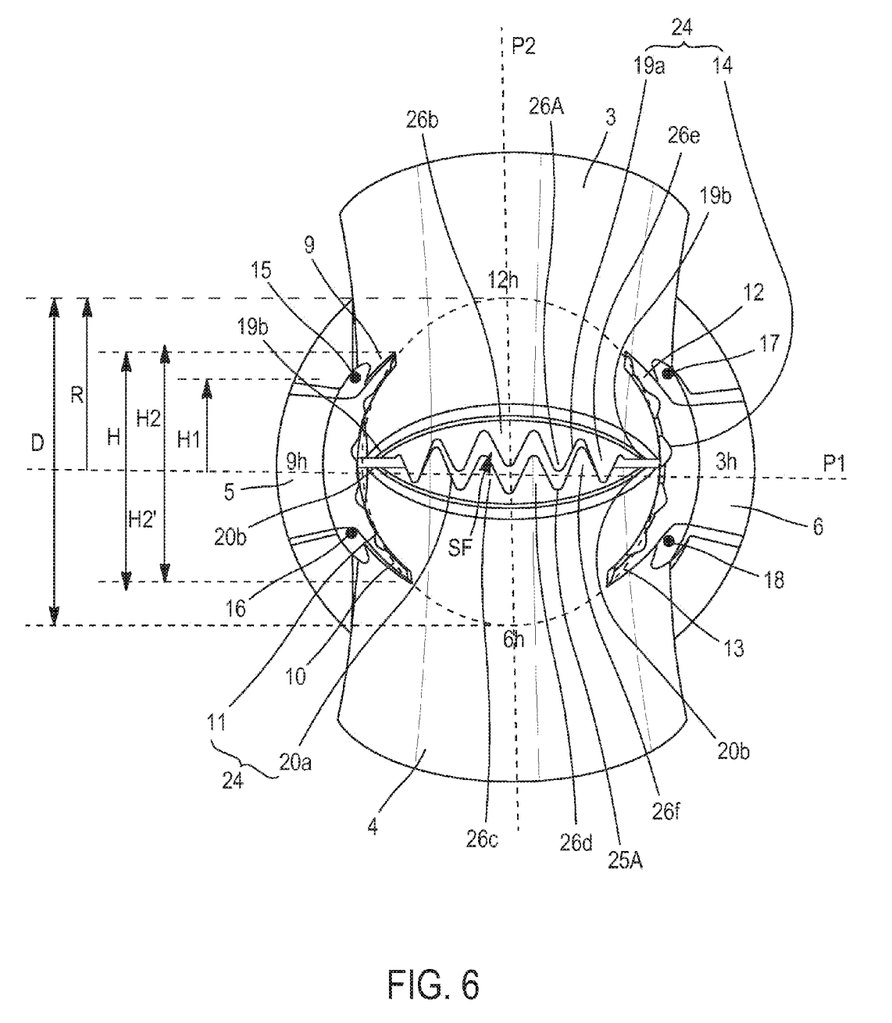
FIG. 6 is a schematic rear view of an afterbody according to the invention comprising an exhaust nozzle having noise-reduction chevrons at the output with the thrust reverser in the open position.

In the same way, pivot shafts 15, 16 and 17, 18, which can be seen in FIG. 6 and are perpendicular to the vertical axial plane P2, are installed on said lateral beams 5, 6. The pivoting doors 3, 4 also have a middle lateral edge 19a, 20a which is connected to the downstream edge 11-14 of each lateral beam 5, 6 to form the output edge of the exhaust nozzle 1, in the retracted position of the doors shown in FIG. 4.

Likewise, as can be seen in part in FIG. 4, the inner wall of the pivoting doors 3, 4 covers part of the inner walls of the lateral beams 5 and 6 up to a limit forming the curve 21 on the upper door 3 and 22 on the lower door 4. Similarly, said curves 21, 22 end downstream in a portion 19b, 20b which meets the middle edge 19a, 20a of each pivoting door 3, 4 to form the lateral downstream edge on each side therefrom. The considerations relating to the shape of the outlines of said downstream lateral edges 19b, 20b in the vertical plane P2 and the angle A that they form with a plane which is transverse to the axis XX' are the same as for the exhaust nozzle having the reference numeral 1.i.

According to the invention, with reference to FIG. 4, the downstream edge 24 of the exhaust nozzle 1, which is formed by joining together the middle downstream edges 19a, 20a of the pivoting doors and the downstream edges 11-14 of the lateral beams 5, 6, comprises indentations 25, which have a rounded, substantially triangular shape on said downstream edge. The indentations 25 thus define noise-reduction chevrons 26 which likewise have a rounded triangular shape, on the trailing edge 24 in the extension of the exhaust nozzle 1. Of course, the indentations 25 and the chevrons 26 could have any other suitable shape (for example a trapezoidal shape).

Figure 8:
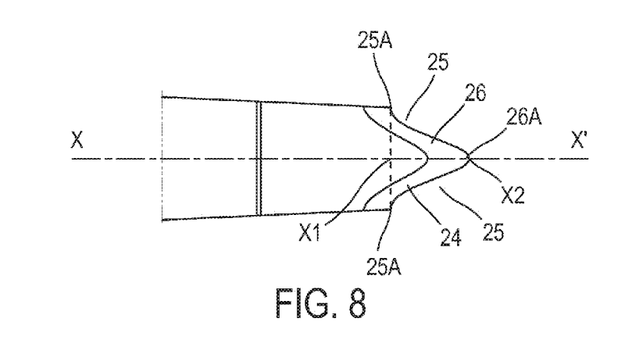
FIG. 8 is a schematic plan view of a noise-reduction chevron in a radial direction passing through the centre of the chevron.

With reference to FIG. 8, the indentations 25, which are at a regular distance from one another in the circumferential direction (although this could be different), defined by an apex 25A and the chevrons 26 defined by a point 26A, are at a regular distance from one another. In addition, although this can be different, in the example in FIG. 4, the indentations 25 are identical to one another. The same thus applies with regard to the chevrons 26.

The apexes 25A of the indentations 25 have an abscissa X1 on the axis XX', and the points 26A of the chevrons 26 have the abscissa X2 of the transverse plane defining the end of the exhaust nozzle 1.

Figure 7:
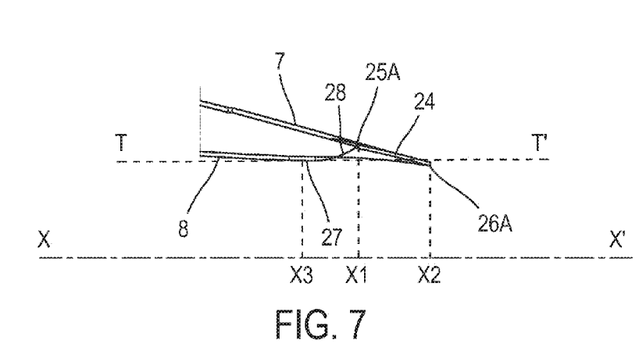
FIG. 7 is a schematic sectional view of a noise-reduction chevron in an axial plane passing through the apex of the indentation.

With reference to FIG. 7, according to a first embodiment of the chevrons, the radius of the cross section of the inner wall 8 of the exhaust nozzle 1 is circular up to an abscissa X3 which corresponds to a neck where the surface area of the cross section of the duct is at a minimum. The line 27, which defines the inner wall 8 of the exhaust nozzle 1 downstream of the abscissa X3 of the neck in the axial plane passing through the point 26A of a chevron, moves away radially towards the inside of the tangent TT', passing through the point of the inner wall of abscissa X3 of the neck, in such a way that the point 26A of the chevron is located between the tangent TT' and the axis XX'. Thus, the chevron, in particular the point 26A thereof, penetrates into the internal flow.

The penetration of the chevrons is an important parameter and will thus be controlled by geometric parameters such as the average angle of said line 27 and the difference between the abscissa X2 of the point 26A of the chevron and the abscissa X3 of the neck.

However, said penetration has a negative effect on the operational performance of the exhaust nozzle 1 by reducing the effective output portion, in particular for speeds at low rates of expansion. In the example shown in FIG. 7, the radius of the apex 25A of the indentation 25 is greater than at the neck, and the line 28 defining the inner wall in the axial plane passing through said apex moves away radially towards the outside of the tangent TT' to the neck. Known means make it possible to give the inner wall 8 of the exhaust nozzle a regular shape, which ensures a continuous tangent and minimises the inflection points, passing through the downstream edge 24, and the above-described lines 27 and 28 in the axial planes passing through the apexes 25A of the indentations and the points 26A of the chevrons. This makes it possible to compensate for the effect of closure due to the penetration of the chevrons and to increase the effective output portion.

In the example in FIG. 7, the cross section of the inner wall 8 of the exhaust nozzle 1 is thus no longer circular after the abscissa X3 of the neck. Other embodiments of the ring of chevrons which can be applied to the invention are conceivable, however. For example, contrary to the example in FIG. 7, the thickness of the exhaust nozzle can be low, or constant, in the region of the ring of chevrons. In this case, the shape of the outer wall 7 follows that of the inner wall 8.

In another type of embodiment, the cross section of the inner wall 8 can remain circular in a transverse plane after the neck. In this case, the line 27 defining the inner wall in the axial plane between the neck and the point 26A of a chevron can have a more complex shape, with an inflection point for preserving an effect of opening of the output portion in the region of the apex 25A of the indentations.

Figure 5:
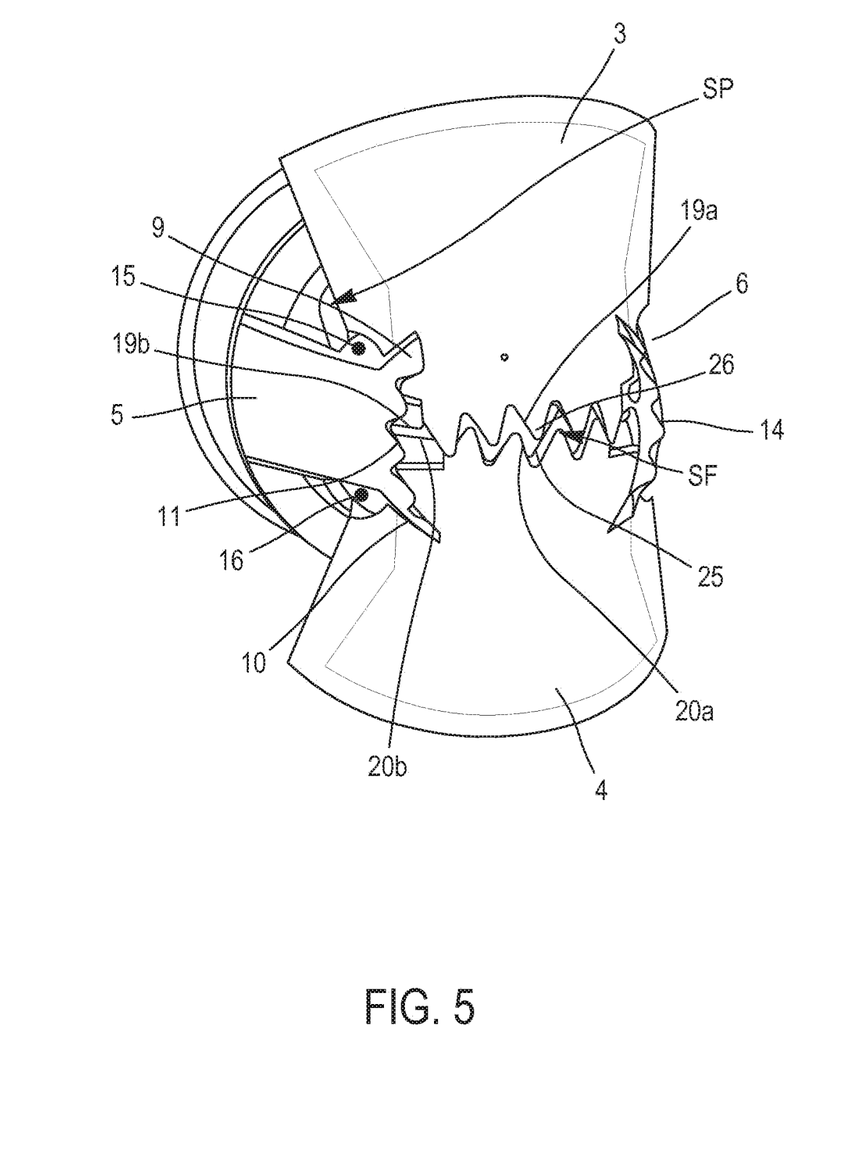
FIG. 5 is a schematic perspective rear view of an afterbody according to the invention comprising an exhaust nozzle having noise-reduction chevrons at the output with the thrust reverser in the open position.

Departing from one of the above-mentioned embodiments for the ring of chevrons, the cutout in the downstream edge 24 between the middle downstream edge 19a, 20a of a pivoting door 3, 4, and the downstream edge 11-13 of a lateral beam 5, 6 is necessarily made between the apex 25A of an indentation and the point 26A of a chevron, as indicated in FIG. 4 for the upper downstream edge of the lateral beam 5. The abscissa along the axis XX' of symmetry of this connection point is thus between the abscissae X1 and X2. Said abscissa also corresponds to the downstream end of the lateral edges 19b of the upper pivoting door 3 and, in a symmetrical manner to the downstream end of the lateral edges 20b of the lower pivoting door 4. With reference to the considerations based on FIG. 2, the geometric parameters of the reversal system are arranged with respect to said connection point and to the average radius R of the output portion S at said abscissa, to allow the middle edges 19a, 20b to be positioned close to the horizontal axial plane when the doors are deployed, as is also shown in FIG. 5. These parameters include the angle A which is formed by the outline of the lateral edge 19b, 20b of a pivoting door in the vertical axial plane and the position of the pivot shafts 15, 16, 17, 18. In particular, the ratio of the height H2 of a protrusion 9, 10, 12, 13 to said average radius R is generally, as in the case of the reference exhaust nozzle, at least equal to two thirds of the radius R.

This arrangement makes it possible, in particular, to preserve an opening angle of the doors 3, 4 and a well portion SP which are close to those of the afterbody comprising the axisymmetric exhaust nozzle having reference numeral 1i.

In a preferred embodiment, which is shown in FIGS. 4 to 6, the ring of chevrons has an odd number of chevrons 26 which are distributed regularly. There are 19 chevrons in the example shown, but different odd numbers are conceivable.

In addition, the distribution of the chevrons is symmetrical with respect to the vertical axial plane P2, which is perpendicular to the direction of the pivot shafts 15, 16, 17, 18. This feature implies, as is shown in FIG. 6, that the points 26A of the chevrons of the middle edge 19a of the upper door 3 are located opposite the apexes 25A of the indentations of the middle edge 20a of the lower door 4 and vice versa.

In this way, when the pivoting doors 3, 4 are deployed to close the thrust-reversal system, as is also shown in FIGS. 5 and 6, the chevrons 26 of the middle edge 19a, 20a of a pivoting door 3, 4 interlock with the indentations 25 of the middle edge 20a, 19a of the opposing pivoting door 4, 3. This reduces the amplitude limitation of the pivot of the doors 3, 4 to prevent contact between the opposing middle edges. As a result, the surface area of the residual opening SF is maintained within an acceptable limit for the expected counter-thrust performance of the system.

As can be seen in FIGS. 5 and 6, the outline on a transverse plane of said residual opening SF is no longer lenticular but serrated. In addition, bringing the lateral edges 19b and 20b closer together is not sufficient to prevent the overlap of the middle edges 19a, 20a.

However, it should be noted that the shapes of the chevrons 26 and those of the indentations 25 are defined in correspondence in such a way that the interlocking thereof limits said residual opening SF to the maximum over the entire extension of the middle edges 19a, 20a when the pivoting doors 4, 3 are deployed. As a result, as can be seen in FIG. 6, the point 26A of each chevron 26 is placed inside the apex 25A of the corresponding indentation 25 on the opposing door, without going past it and without there being any overlap of the middle portions of the downstream edges when the doors 3 and 4 are deployed.

For this purpose, as can be seen in FIG. 6, the triangular shape having rounded apexes of the chevrons 25 and the indentations 26, which is used in the example shown, makes it possible to bring the edge of a chevron 26A substantially closer to that of the opposing indentation 25A without any overlap of the middle edges when the doors are deployed. Each chevron 26 comprises a convex rounded apex or point 26A and each indentation 25 comprises a concave rounded apex 25A.

In order to minimise the end effects, close to the lateral beams 5, 6, it is possible to use the design shown in FIGS. 5 and 6. In this example, the cutting-out of the chevrons, between the downstream edge 11-14 of a lateral beam 5, 6 and the middle downstream edge 19a, 20a of a pivoting door 3, 4 is carried out close to the apex 25A of an indentation 25.

Still in the example in question, since the number of chevrons 26 is odd, the cutting-out cannot be symmetrical between the upper door 3 and the lower door 4. It can be seen for example, in FIG. 6, that the upper middle downstream edge 19*a* has five chevrons, whereas the lower middle downstream edge 20*a* has only four.

In this example, this leads to the protrusions of the bottom 10-13 on the lateral beams 5, 6 ending at a distance H2' from the horizontal axial plane which is slightly greater than the distance H2 at which the protrusions of the top 9-12 end, as is also indicated in FIG. 6. Due to a collateral effect, the lateral edges 20*b* of the pivoting door 4 of the bottom are slightly longer than the lateral edges 19*b* of the pivoting door 3 of the top. This creates an offset of the middle edges 19*a*, 20*b* which makes it possible to bring the lateral edges 19*b*, 20*b* slightly closer together and thus to reduce the extension of the residual opening SF.

In this regard, it will be noted that, with reference to the fact that if the height H2, H2' of each protrusion of the top 9-12 and the bottom 10-13 on the lateral doors 5, 6 remains at least equal to two thirds of the radius R of the average output portion S of the exhaust nozzle, which is indicated as a broken line in FIG. 6, in the region of the connection between the downstream edges (11, 14) of the lateral doors and the middle downstream edges (19*a*, 20*a*) of the pivoting doors, then the gap H between the two ends of each protrusion, which is equal to the sum of H2 and H2', is also at least equal to two thirds of the diameter D of the portion. Said diameter D also represents the maximum gap between the middle downstream edges (19*a*, 20*a*) of the pivoting doors (3, 4) in said portion S.

A variant can be used additionally or independently. It consists in distinguishing between the chevrons according to the azimuth position thereof on the middle edges 19*a*, 20*a* of the pivoting doors.

On one hand, the chevrons, such as 26*b*, 26*c*, 26*d* shown in FIG. 6, which are positioned close to the vertical axial plane P1, do not pose a particular problem. Said chevrons can be sized so as to optimise the noise-reduction effect thereof. Firstly, the front of said chevrons slot together with the opposing indentation; secondly, due to the generally circular periphery of the downstream edge 24 of the exhaust nozzle, they are of course slightly further apart than the others when the pivoting doors 3, 4 are deployed. It is thus easy, even with a high degree of penetration, to design the downstream edge 24 so that they do not interlock.

On the other hand, the chevrons, such as 26*e* and 26*f*, which are located at the lateral ends, are located opposite one another with a certain degree of incidence when the doors 3 and 4 are deployed. They thus limit the door closure because the point of a chevron, for example 26*e*, is at a risk of coming into contact, in an oblique manner, with the chevron 26*f*.

In the variant in question, it is thus conceivable to limit the parameters determining the penetration of the chevron 26*d*, be it in length, or in terminal radius, or both, to prevent said chevron from hitting the chevron 26*f* It is also possible to modify the shape of the line of the downstream edge 24 between the chevron 26*f* and the adjacent indentation so that it avoids the chevron 26*e*.

Such modifications diminish the noise-reduction performance of the chevrons in question. In a variant which can be used additionally, it is thus possible to modify the design of the chevrons which are present on the downstream edges 11-14 of the lateral beams 5, 6 to increase the noise-reduction performance thereof and compensate for the loss of effectiveness due to the modifications made to the chevrons, 26*d*-26*f*, of the middle downstream edges 19*a*, 20*a* of the pivoting doors. As a result of the kinematics of the thrust-reversal system, the chevrons of the downstream edges 11-14 of the lateral beams 5, 6 remain remote from the pivoting doors 3, 4 when they tilt. No particular constraint is thus imposed thereon by the thrust-reversal system. It is thus possible in particular to increase the penetration thereof to improve the acoustic performance in terms of noise-reduction.

The invention has been presented in examples where the chevrons are distributed substantially regularly in azimuth. It is conceivable to use a ring for which the extension in azimuth varies. It can be useful for example to adapt the shape of the chevrons 26*d*-26*f* at the lateral ends of the middle downstream edges 19*a*, 20*a*. In pursuing this route, another variant can use an even number of chevrons if for example an asymmetry of the number of chevrons between the downstream edges 11-14 of the lateral beams compensates for the asymmetry of the number of chevrons between the middle downstream edges 19*a*, 20*a* of the pivoting doors 3, 4.

Furthermore, although the symmetry with respect to the vertical axial plane P2 optimises the closure of the residual opening SF, the invention can be applied even if said symmetry can only be imposed if a chevron 26 of a middle downstream edge 19*a*, 20*b* remains positioned opposite an indentation 25 of the opposing middle downstream edge 20*a*, 19*a*. In addition, for expediency, the invention has been presented with rotational shafts 15, 16, 17, 18 of the horizontal doors 3, 4, but the geometry of the afterbody can be rotated by an arbitrary angle about the axis XX'.

Figure 9:
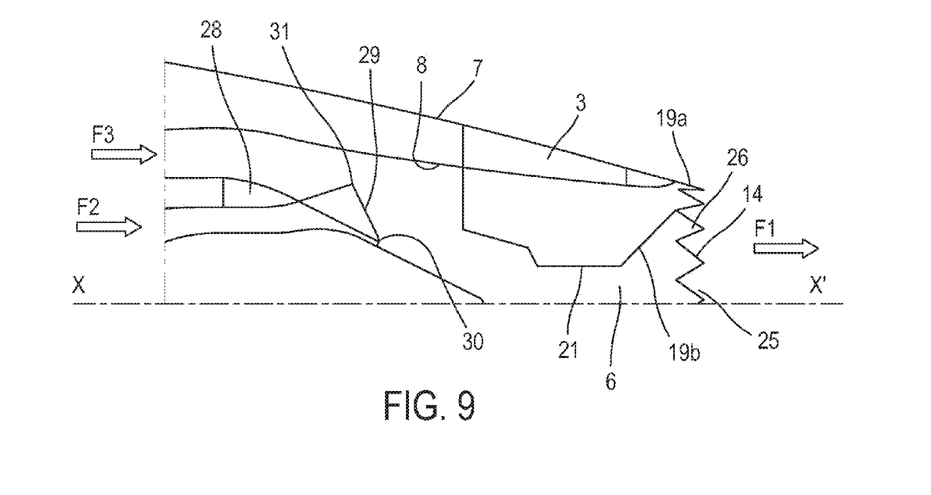
FIG. 9 is a schematic longitudinal section of a mixed-flow turbojet engine afterbody comprising an exhaust nozzle according to the invention and a lobed mixer.

In addition, as is already indicated very schematically in FIG. 9, a thrust-reversal system of this type can be installed on a mixed-flow turbojet engine afterbody. In this case, a lobed mixer 28 can be installed in the exhaust nozzle 1 at the junction between a primary flow F2 and a secondary flow F3 before the passage into the portion where the thrust-reversal system, which is equipped with a ring of chevrons according to the invention, is located.

With reference to FIG. 9, the lobed mixer 28 is a shaped part extending, inside the exhaust nozzle 1, the walls separating the inflow of primary flow F2 and the inflow of secondary flow F3. At the downstream end thereof, said mixer has a trailing edge 29, the thickness of which is generally low to prevent a base flow effect between the two flows. The lobed mixer 28 generally stops at a significant distance from the downstream end of the exhaust nozzle 1 to allow the flow mixture to homogenise by forming the flow F1 which leaves the exhaust nozzle and which will be deflected by the pivoting doors 3 and 4 when they are deployed.

An embodiment of the mixer 6 is formed with regular, symmetrical lobes azimuthally around the axis XX' of the turbojet engine. In this example, the trailing edge line 29 has a regular, undulating three-dimensional shape in azimuth which regularly passes through a low point 30 having a minimum radius and a high point 31 having a maximum radius. The shape of the mixer is preferably achieved by joining said trailing edge line 29 through smooth regular surfaces, on one side at the circular portion of the outer wall of the inflow of primary flow F2, and on the other side at the circular portion of the inner wall of the inflow of secondary flow F3. Known means allow a person skilled in the art to achieve said smooth surfaces by defining regular laws for radius variation to join the input portions at the trailing edge 29 of the lobed mixer 28.

In the example in question, the changes in the trailing edge 29 of the mixer 28 are regular. In this manner, the average surface area between the radially outer wall and the radially inner wall of the mixer 28 makes regular undulations azimuthally around the axis XX' which create, on the side of the primary flow F2, divergent lobes which are referred to as hot, under the high points 31 of the trailing edge 29, and on the side of the secondary flow F3, convergent lobes which are referred to as cold, above the low points 30 of the trailing edge 29.

It is known to design a lobed mixer 28 according to this configuration to reduce the jet noise of the exhaust nozzle 1, in particular at low frequencies. This effect can be combined with that of noise-reduction chevrons. However, to prevent harmful interactions between the two devices, in particular on the high-frequency portion of the noise spectrum, it is preferable to adapt the distribution of the lobes of the mixer 28 and that of the noise-reduction chevrons to one another.

A preferred embodiment of the invention in correspondence with a lobed mixer consists in designing the ring of chevrons 26 and the lobed mixer 28 with the same regularity, by positioning the point 26A of the chevrons 26 azimuthally in the centre of the hot lobes of the mixer 28, i.e. opposite the high points 31 of the trailing edge 29 of the mixer.

In the particular case of the invention, it is the geometry of the ring of chevrons 26 which imposes the azimuthal distribution of the lobes of the mixer 28. For example, in the example shown in FIGS. 4 to 6, the mixer 28 must have 19 hot lobes which are regularly distributed azimuthally and, preferably, an upper hot lobe is centred on the vertical axial plane P2 with the high point 31 thereof located behind the point of the chevron 26b which is located in the middle of the middle downstream edge 19a of the upper pivoting door 3.

The invention claimed is:

1. An afterbody of a turbojet engine having a central axis, the afterbody comprising:
   an exhaust nozzle including first and second doors mounted opposite one another between two lateral beams and pivoting about shafts defining a pivot direction, each door of the first and second doors having a downstream edge provided with a middle portion, said first and second doors pivoting between a retracted position, in which said middle portions of the first and second doors form an edge of an output portion of the exhaust nozzle in combination with downstream edges of the two lateral beams, and a deployed position, in which said middle portions of the downstream edges of the first and second doors join together to block a channel between the two lateral beams in order to reverse the thrust of gases from the turbojet engine,
   wherein the edge of the output portion of the exhaust nozzle includes a ring comprised of noise-reduction chevrons alternating with indentations, the middle portion of the first door comprising a first portion of the noise-reduction chevrons and a first portion of the indentations, the middle portion of the second door comprising a second portion of the noise-reduction chevrons and a second portion of the indentations, and said downstream edges of the lateral beams each comprising a number of noise-reduction chevrons and a number of indentations,
   said ring being arranged such that a portion of each noise-reduction chevron formed on the middle portion of the downstream edge of one door of the first and second doors is opposite a portion of a respective indentation formed in the middle portion of the downstream edge of the other door of the first and second doors in a direction which is perpendicular to said pivoting direction,
   said afterbody being arranged such that when the first and second doors are in the deployed position, the portion of each noise-reduction chevron formed on the middle portion of the one door of the first and second doors interlock with the portion of the respective indentation formed in the middle portion of the other door of the first and second doors without any overlapping of the middle portions of the first and second doors with regard to a transverse plane perpendicular to an axial plane of the turbojet engine.

2. The afterbody of a turbojet engine according to claim 1, wherein the ring of noise-reduction chevrons includes a part of a noise-reduction chevron on the downstream edges of the lateral beams, the portion of noise-reduction chevrons of said middle portion of the downstream edge of the first and second doors and the part of the noise-reduction chevron on the downstream edges of the lateral beams being separated close to an apex of an indentation.

3. The afterbody of a turbojet engine according to claim 2, wherein a geometry of the part of the noise-reduction chevrons placed on the downstream edges of the two lateral beams differs from portions of the noise-reduction chevrons placed on the middle portion of the downstream edge of the first and second doors so as to improve the acoustic performance of the part of the noise-reduction chevrons placed on the lateral beams by comparison with the portions of the noise-reduction chevrons placed on the first and second doors.

4. The afterbody of a turbojet engine according to claim 1, wherein the number of noise-reduction chevrons in the ring is odd.

5. The afterbody of a turbojet engine according to claim 1, wherein the noise-reduction chevrons on the first and second doors are symmetrical with respect to the axial plane of the turbojet engine which is perpendicular to said pivoting direction.

6. The afterbody of a turbojet engine according to claim 1, wherein the indentations and the noise-reduction chevrons have a substantially triangular shape having rounded apexes on the downstream edges of the first and second doors.

7. The afterbody of a turbojet engine according to claim 1, wherein a penetration into the channel of the portion of the noise-reduction chevrons placed on the middle portion of the downstream edge of the first and second doors decreases as the distance thereof increases from an axial plane which is perpendicular to said shafts defining the pivoting direction.

8. The afterbody of a turbojet engine according to claim 1, wherein a distance separating two points connecting the downstream edge of each lateral beam to the middle portion of the downstream edge of the first and second doors is at least equal to two thirds of a maximum gap between the middle portions of the downstream edge of the first and second doors in the plane which is transverse to a central axis which passes through said two points.

9. A mixed-flow turbojet engine comprising an afterbody according to claim 1.

10. The mixed-flow turbojet engine according to claim 9, further comprising a lobed mixer inside the exhaust nozzle, the lobed mixer including divergent lobes, wherein the divergent lobes are equal in number to the noise-reduction chevrons and are centered in azimuth on said noise-reduction chevrons.

11. The afterbody of a turbojet engine according to claim 1, wherein the shafts are installed on said lateral beams and each first and second doors comprise two symmetrical holes with regard to the axial plane of the turbojet engine, said two symmetrical holes being aligned coaxially with two of the shafts.

12. The afterbody of a turbojet engine according to claim 1, wherein the first and second doors form at least a portion of a wall of the exhaust nozzle.

13. The afterbody of a turbojet engine according to claim 1, wherein the first portion of the noise-reduction chevrons of the first door interlock with the second portion of the indentations of the second door without physical contact.

14. An afterbody of a turbojet engine having a central axis, said afterbody comprising:
- an exhaust nozzle including a first door and a second door mounted opposite one another between two lateral beams and pivoting about shafts defining a pivoting direction, each first and second door having a downstream edge provided with a middle portion, said first and second doors pivoting between a retracted position, in which said middle portions of the first and second doors form an edge of an output portion of the exhaust nozzle in combination with downstream edges of the two lateral beams, and a deployed position, in which said middle portions of the first and second doors join together to block a channel between the two lateral beams in order to reverse the thrust of exhaust gas of the turbojet engine,
- wherein the edge of the output portion of the exhaust nozzle includes a ring of noise-reduction chevrons alternating with indentations, the middle portion of the first door comprising a first portion of the noise-reduction chevrons and a first portion of the indentations, the middle portion of the second door comprising a second portion of the noise-reduction chevrons and a second portion of the indentations, and said downstream edges of the two lateral beams each comprising a number of noise-reduction chevrons and a number of indentations,
- said ring of noise-reduction chevrons alternating with indentations being arranged such that the first portion of the noise-reduction chevrons being formed on the middle portion of the downstream edge of the first door is opposite the second portion of the indentations formed in the middle portion of the second door in a direction which is perpendicular to said pivoting direction,
- said afterbody being arranged such that when the first and second doors are in the deployed position, the first portion of the noise-reduction chevrons of the first door interlock with the second portion of the indentations of the second door with a residual opening between the middle portions of the first and second doors.

15. The afterbody of a turbojet engine according to claim 14, wherein the number of noise-reduction chevrons in the ring is odd.

16. The afterbody of a turbojet engine according to claim 14, wherein the noise-reduction chevrons of the first and second doors are symmetrical with respect to an axial plane which is perpendicular to said pivoting direction.

17. The afterbody of a turbojet engine according to claim 14, wherein the indentations and the noise-reduction chevrons have a substantially triangular shape having rounded apexes on the downstream edges of the first and second doors.

18. An afterbody of a turbojet engine having a central axis, the afterbody comprising:
- an exhaust nozzle including first and second doors mounted opposite one another between two lateral beams and pivoting about shafts defining a pivot direction, each door of the first and second doors having a downstream edge provided with a middle portion, said first and second doors pivoting between a retracted position, in which said middle portions of the first and second doors form an edge of an output portion of the exhaust nozzle in combination with downstream edges of the two lateral beams, and a deployed position, in which said middle portions of the downstream edges of the first and second doors join together to block a channel between the two lateral beams in order to reverse the thrust of exhaust gases from the turbojet engine,
- wherein the edge of the output portion of the exhaust nozzle includes a ring comprised of noise-reduction chevrons alternating with indentations, said ring being arranged such that a portion of each noise-reduction chevron formed on the middle portion of the downstream edge of one door of the first and second doors is opposite a portion of a respective indentation formed in the middle portion of the downstream edge of the other door of the first and second doors in a direction which is perpendicular to said pivoting direction,
- said afterbody being arranged such that when the first and second doors are in the deployed position, the portion of each noise-reduction chevron of one door of the first and second doors interlock with the portion of the respective indentations of the other door of the first and second doors without any physical contact.

* * * * *